F. J. BRINGHAM.

BILLET LOOP.

No. 11,488. Reissued Apr. 16, 1895.

Attest
Walter Macdonald
F. L. Middleton

Inventor
Friend J. Bringham
by Ellis Spear
Atty.

THE NORRIS PETERS CO., PHOTO-LITHO., WASHINGTON, D. C.

UNITED STATES PATENT OFFICE.

FRIEND JOHNSON BRINGHAM, OF CHICAGO, ILLINOIS, ASSIGNOR, BY DIRECT AND MESNE ASSIGNMENTS, TO THE SEAMLESS LEATHER COMPANY, OF SAME PLACE.

BILLET-LOOP.

SPECIFICATION forming part of Reissued Letters Patent No. 11,488, dated April 16, 1895.

Original No. 500,111, dated June 27, 1893. Application for reissue filed March 4, 1895. Serial No. 540,537.

*To all whom it may concern:*

Be it known that I, FRIEND JOHNSON BRINGHAM, formerly of Oroville, in the county of Butte and State of California, now of Chicago, in the county of Cook and State of Illinois, have invented certain new and useful Improvements in Leather Loops; and I do hereby declare the following to be a full, clear, and exact description of the invention, such as will enable others skilled in the art to which it appertains to make and use the same.

My invention relates to leather loops for harness, saddles, bridles, &c., the object of my invention being to supply an endless split leather loop formed from a single piece of leather, without sewing or otherwise securing together the loose ends of the piece of leather forming the loop, and without cutting such piece of leather upon curved lines to be afterward made straight by stretching and cramping.

The loop as well as the manner of forming the same is fully illustrated in the accompanying drawings, in which similar letters of reference designate corresponding parts.

Figure 1:
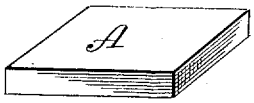
Figure 2:
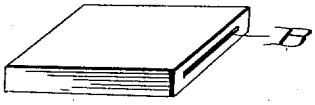
Figure 3:
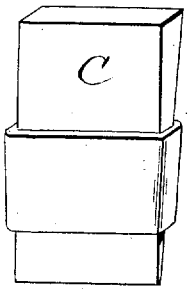
Figure 4:
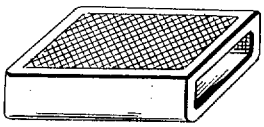

Figure 1 is a perspective view of a section or block of leather as first cut off to form a loop therefrom. Figs. 2, 3 and 4 show the same at successive stages of the operation, and Figs. 5, 6 and 7 show various forms of the finished product.

The manner of forming my newly invented endless-split-leather loop is as follows: I first cut a block A of leather of suitable size as shown in Fig. 1. This block is then split centrally edgewise leaving at each end of the split an unsplit margin of sufficient thickness to form afterward, by blocking or pressure, sides of the uniform thickness with the top and bottom of the loop. The second step of the process is illustrated in Fig. 2 which shows the slit B through the center of the block A. The next step in forming my loop is to enlarge and shape by pressure outward, the slit B so formed. This may be accomplished by any suitable means. In Fig. 3 I have shown a wedge C which is driven into the loop for this purpose. After the loop has been enlarged to the required size, it is finished by trimming and creasing and presents the appearance shown in Fig. 4.

Figure 5:
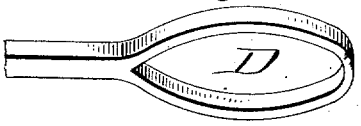
Figure 7:
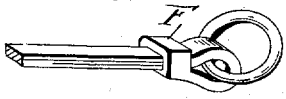
Figure 6:
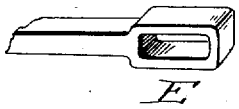

D and E in Figs. 5 and 6 are other forms of loops, and F in Fig. 7 is a loop made by the same method upon the end of a strap.

In Figs. 5 and 6, I have shown the end of the strap slitted transversely, and formed into a loop by expansion and pressure. In these figures, the loop is slit from edge to edge as in Figs. 2 to 4 inclusive, with this difference only that the loop is formed upon the end of the strap and forms therewith a connection for the strap. These loops are shown at D and E, and differ only in contour. In Fig. 7 I have modified the form of slitting, and instead of slitting from edge to edge, I slit from the end of the strip, longitudinally a distance equal to the length desired of the loop, leave the edges uncut, but open the bottom of the slit to the outside and then form an open loop by expansion and pressure. In this form or modification the strap may be doubled back upon itself and passed through the loop, as shown in Fig. 7. The forms of Figs. 5 and 6 are adapted to be connected with another strap, and that of Fig. 7 is adapted to receive the end of the same strap or for connection with a ring It will be readily seen from the foregoing description that the method of forming my newly invented endless split leather loop possesses the advantage over the old method of manufacturing loops, of being economical both as regards material and labor and the loop thus formed is superior in point of neatness and durability to those previously manufactured.

Having fully described my invention, what I claim is—

1. A seamless leather loop, comprising a block of leather slitted between and approximately parallel to two of its opposing surfaces, and afterward expanded and enlarged to form the opening therethrough, substantially in the manner and for the purpose specified 2. A seamless leather loop, formed upon the end of a strap of leather, which is slitted longitudinally of the strap, between and approximately parallel to its opposing faces a distance equal to the length of the loop said slitted portion being opened to the outside and expanded to form an opening therethrough in line with the strap, substantially as described.

3. A seamless leather loop formed upon the end of a strap of leather, longitudinally thereof, the end of said strap being passed through said seamless loop to form a loop or eye, substantially as described.

FRIEND JOHNSON BRINGHAM.

Witnesses:
HARRY D. KOHN,
GEORGE BADGOLK.